(12) United States Patent
Phillips et al.

(10) Patent No.: US 12,539,205 B2
(45) Date of Patent: Feb. 3, 2026

(54) BODY IMPLANT FIXATION DEVICES, SYSTEMS, AND METHODS OF USE

(71) Applicant: Duke University, Durham, NC (US)

(72) Inventors: Brett Phillips, Durham, NC (US); Muath Bishawi, Durham, NC (US); Kristen Rezak, Durham, NC (US)

(73) Assignee: Duke University, Durham, NC (US)

( * ) Notice: Subject to any disclaimer, the term of this patent is extended or adjusted under 35 U.S.C. 154(b) by 663 days.

(21) Appl. No.: 17/794,806

(22) PCT Filed: Jan. 22, 2021

(86) PCT No.: PCT/US2021/014650
§ 371 (c)(1),
(2) Date: Jul. 22, 2022

(87) PCT Pub. No.: WO2021/150917
PCT Pub. Date: Jul. 29, 2021

(65) Prior Publication Data
US 2023/0143868 A1    May 11, 2023

Related U.S. Application Data

(60) Provisional application No. 62/965,227, filed on Jan. 24, 2020.

(51) Int. Cl.
*A61F 2/12* (2006.01)
*A61F 2/00* (2006.01)

(52) U.S. Cl.
CPC .............. *A61F 2/0077* (2013.01); *A61F 2/12* (2013.01); *A61F 2210/0004* (2013.01); *A61F 2220/0008* (2013.01); *A61F 2250/0031* (2013.01)

(58) Field of Classification Search
CPC .. A61F 2/0077; A61F 2/12; A61F 2210/0004; A61F 2220/0008; A61F 2250/0031; A61F 2/0063; A61B 2090/061
See application file for complete search history.

(56) References Cited

U.S. PATENT DOCUMENTS

| | | |
|---|---|---|
| 8,202,317 B2 | 6/2012 | Becker |
| 9,393,106 B2 | 7/2016 | Van Epps et al. |
| 9,603,698 B2 | 3/2017 | Kerr et al. |

(Continued)

FOREIGN PATENT DOCUMENTS

GB    2562726    11/2018

OTHER PUBLICATIONS

International Search Report and Written Opinion for PCT/US21/14650. Mailed Apr. 8, 2021. 9 pages.

(Continued)

*Primary Examiner* — Suzette J Gherbi
(74) *Attorney, Agent, or Firm* — Casimir Jones, S.C.; Peter J. Schlueter

(57) ABSTRACT

The present disclosure provides devices, systems, and methods relating to performing a medical procedure. In particular, the present disclosure is directed to devices, systems, and methods for positioning and securing a body implant in a subject in a manner that is customizable for each subject and minimizes implant migration. The devices, systems, and methods described herein utilize biocompatible and biodegradable materials that provide enhanced long-term fixation of the implant.

18 Claims, 5 Drawing Sheets

(56) References Cited

U.S. PATENT DOCUMENTS

| | | | |
|---|---|---|---|
| 2009/0082864 A1* | 3/2009 | Chen | A61F 2/12 623/8 |
| 2010/0137999 A1 | 6/2010 | Shohat | |
| 2013/0046383 A1* | 2/2013 | Khouri | A61H 7/00 623/8 |
| 2013/0304098 A1* | 11/2013 | Mortarino | A61F 2/12 606/151 |
| 2015/0012089 A1* | 1/2015 | Shetty | A61F 2/12 623/8 |
| 2017/0143475 A1 | 5/2017 | Moses et al. | |
| 2017/0224472 A1* | 8/2017 | Yamada | A61F 2/12 |

OTHER PUBLICATIONS

Baxter. Internal bra: a unifying solution for reconstructive and aesthetic breast surgery issues. Plast Aesthet Res 2016;3:3-7.

Cheng et al., Treatment of capsular contracture using complete implant coverage by acellular dermal matrix: a novel technique. Plast Reconstr Surg. Sep. 2013;132(3):519-529.

Chopra et al., Techniques to Repair Implant Malposition after Breast Augmentation: A Review. Aesthetic Surgery Journal, vol. 36, Iss 6, Jun. 2016, pp. 660-671.

Compton et al., Seri Surgical Scaffold. Drugwatch. Last updated Sep. 3, 2023.

FDA, Urogynecologic Surgical mesh Implants. Retrieved from the internet Oct. 23, 2023. 3 pages.

Headon et al., Capsular Contracture after Breast Augmentation: An Update for Clinical Practice. Arch Plast Surg. Sep. 2015; 42(5):532-543.

Logan Ellis et al., Biological and synthetic mesh use in breast reconstructive surgery: a literature review. World J Surg Oncol. 2016; 14: 121. 1-9.

Plastic Surgery Statistics Report. American Society of Plastic Surgeons. 2018. 25 pages.

PRMA Plastic Surgery. What is Alloderm Brest Reconstruction ?. 2020, Jul. 8. 22 pages.

* cited by examiner

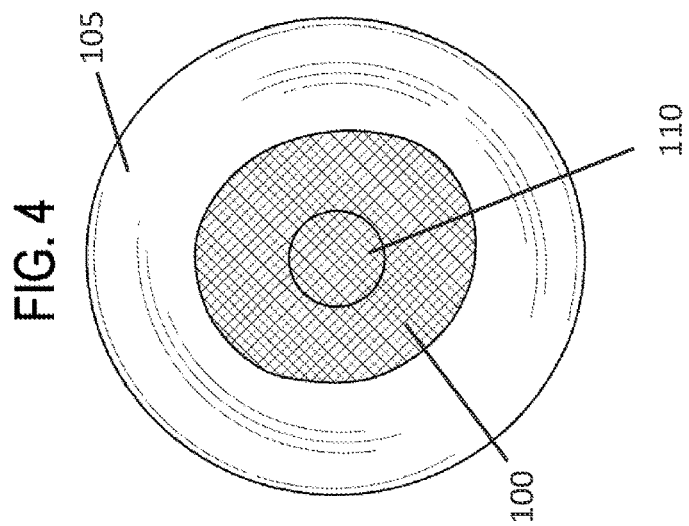
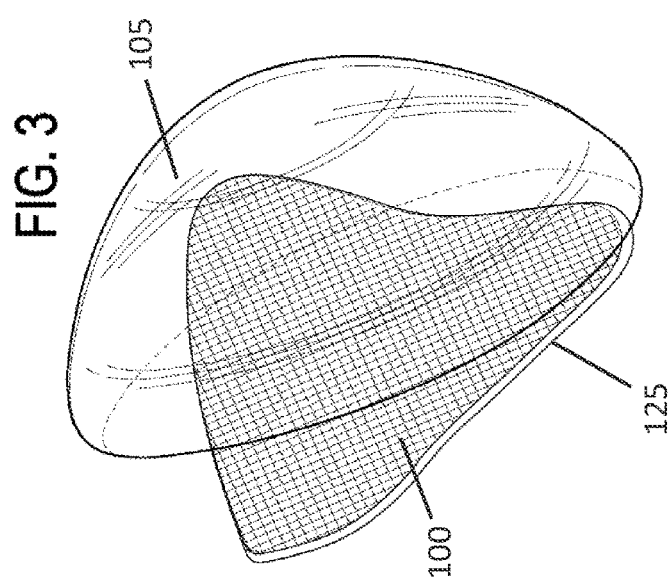
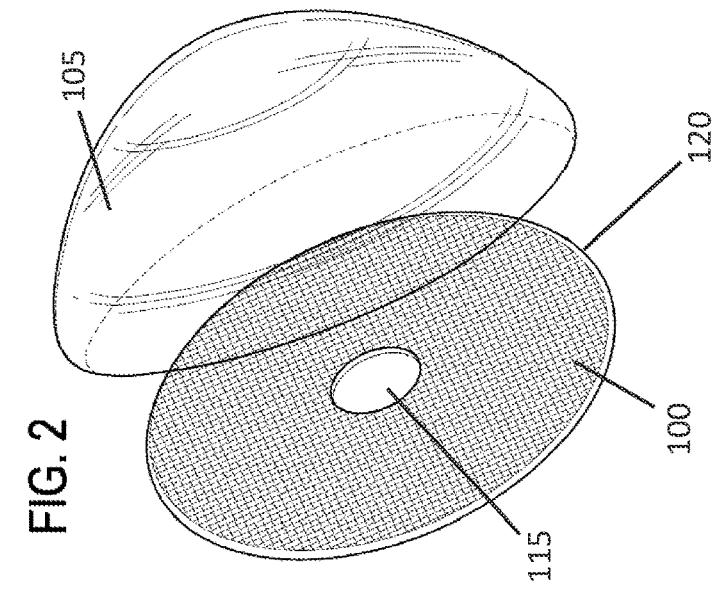

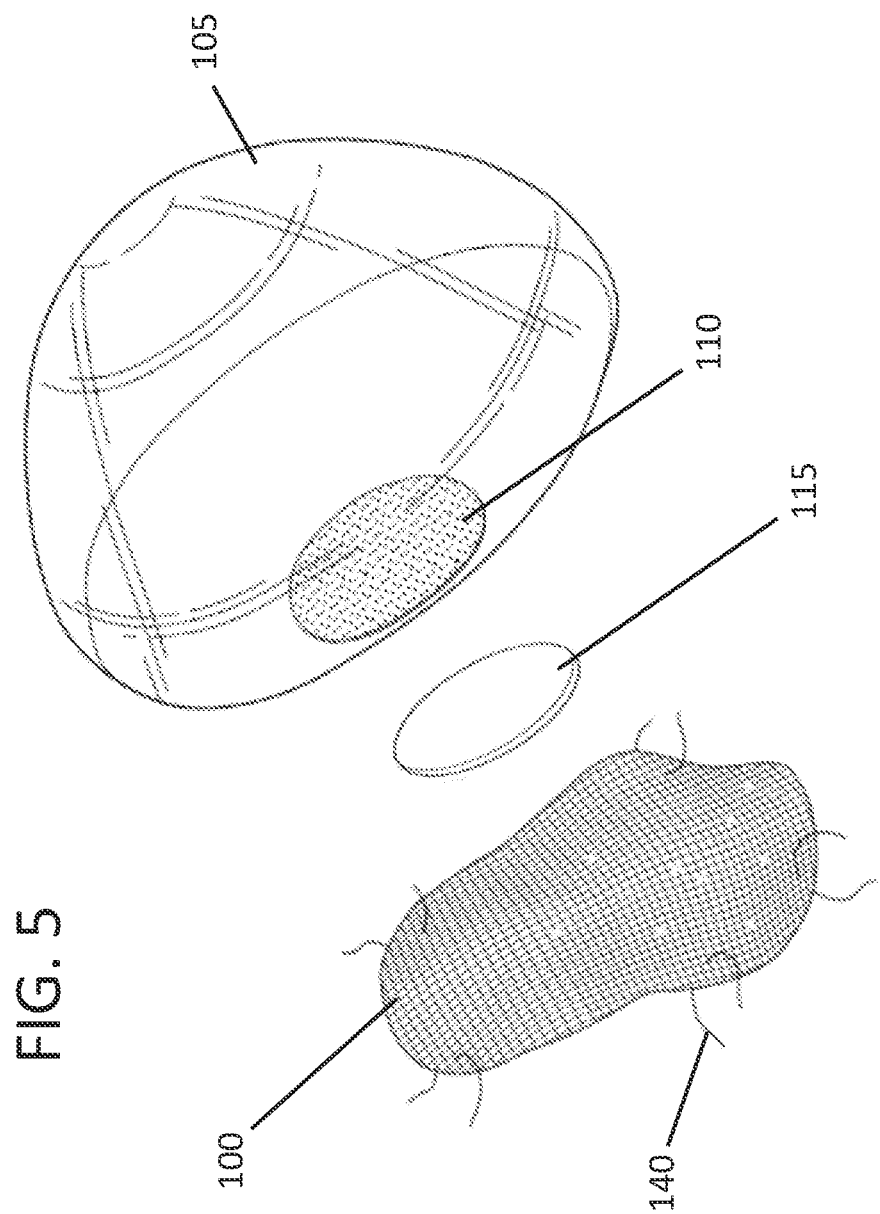

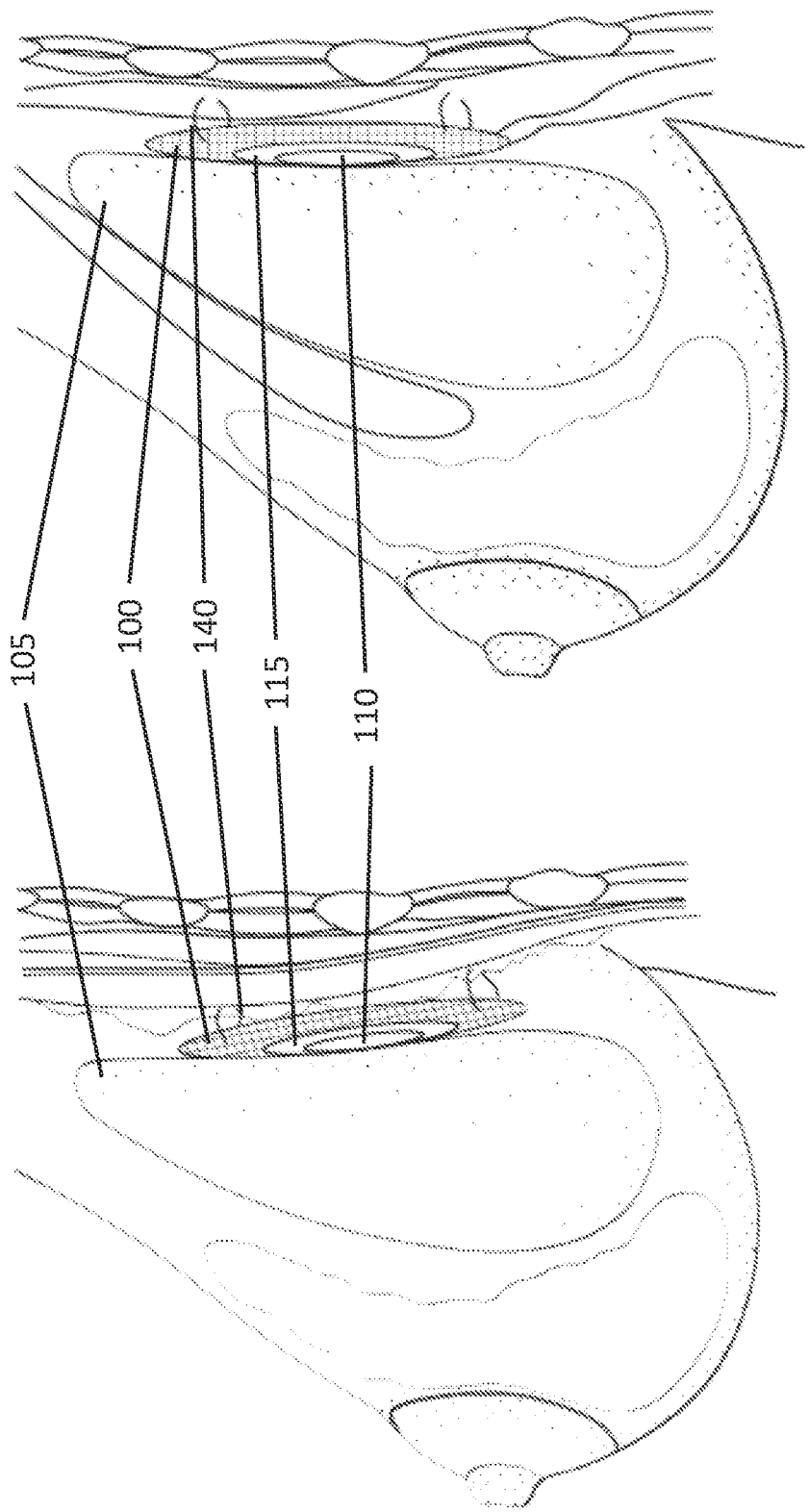

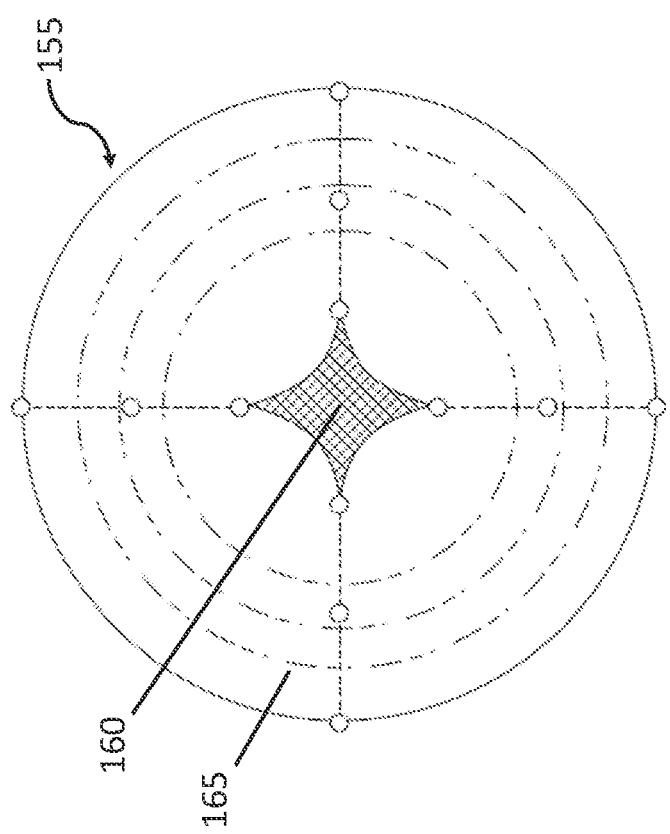
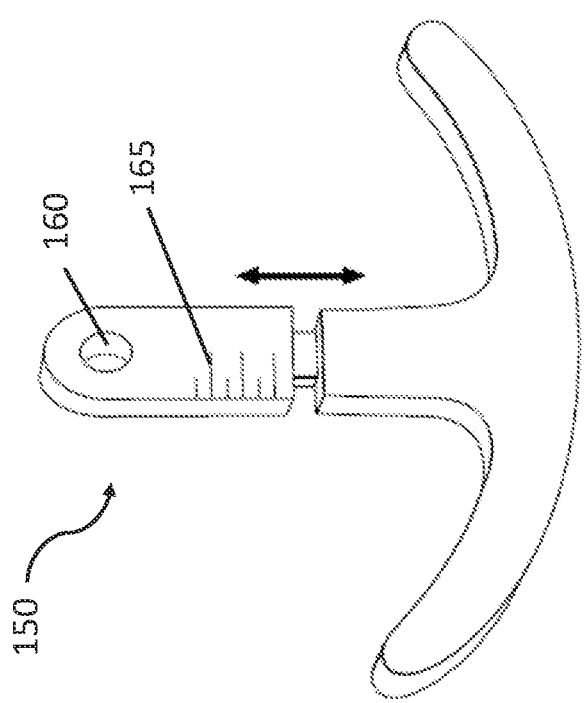

BODY IMPLANT FIXATION DEVICES, SYSTEMS, AND METHODS OF USE

RELATED APPLICATIONS

This application claims priority to and the benefit of U.S. Provisional Patent Application No. 62/965,227 filed Jan. 24, 2020, which is incorporated herein by reference in its entirety for all purposes.

FIELD

This present disclosure provides devices, systems, and methods relating to performing a medical procedure. In particular, the present disclosure is directed to devices, systems, and methods for positioning and securing a body implant in a subject in a manner that is customizable for each subject and minimizes implant migration. The devices, systems, and methods described herein utilize biocompatible and biodegradable materials that provide enhanced long-term fixation of the implant.

BACKGROUND

Procedures for positioning and securing body implants (e.g., breast implants) for augmentation or reconstruction are widely performed and generally considered safe with limited risks. However, one frequent area of concern is the final cosmetic appearance of the implant post-procedure. For example, currently approved FDA permanent breast implants do not include any methods for fixation. In some cases, it is extremely difficult to hold an implant in a prescribed position until the body heals and encapsulates the implant. As a result, implants can sometimes migrate, causing undesirable outcomes, including patient dissatisfaction, breast asymmetry, and abnormal appearance, and in some cases, complications that require further and more intrusive surgeries. One currently available approach to address these challenges involves the use of biocompatible materials such as acellular dermal matrix, which indirectly secures the device by creating a pocket for the implant. However, this approach involves the use of an off-label acellular material and can be cost prohibitive. Hence, there is a need for improved devices, systems, and methods that utilize biocompatible and biodegradable materials to provide enhanced long-term fixation of the implant.

SUMMARY

Embodiments of the present disclosure provide a body implant fixation device for securing a body implant inside a subject. In accordance with these embodiments, the device includes a biocompatible and bioabsorbable mesh material having an anterior face and a posterior face. In some embodiments, the anterior face is configured for attachment to a body implant using a biocompatible and bioabsorbable adhesive agent. In some embodiments, the posterior face is configured for attachment to a portion of a subject's body.

In some embodiments, the device secures a body implant in a fixed position for an extended period of time. In some embodiments, the device persists within the subject's body only until the implant has been substantially encapsulated by the subject's body, after which the device degrades or is absorbed by the subject's body.

In some embodiments, the mesh material comprises a plurality of attachment points for inserting at least one biocompatible and bioabsorbable fastener with which to attach the device to the portion of the subject's body.

In some embodiments, the device further comprises at least one fastener selected from the group consisting of a suture, a screw, a hook, a staple, a clip, an adhesive, and any combinations thereof.

In some embodiments, the mesh material is malleable.

In some embodiments, the mesh material comprises polyethylene, polyurethane, polylactic acid, polydioxanone, polyglycolide, polyglycolic acid, polyglactin, polyglyconate, lactomer glycolide/lactide copolymer, polydimethylsiloxane, polysiloxane, polypropylene, caprolactone, poliglecaprone, polycaprolate, cat gut, and any combinations thereof.

In some embodiments, the at least one fastener comprises polyethylene, polyurethane, polylactic acid, polydioxanone, polyglycolide, polyglycolic acid, polyglactin, polyglyconate, lactomer glycolide/lactide copolymer, polydimethylsiloxane, polysiloxane, polypropylene, caprolactone, poliglecaprone, polycaprolate, cat gut, and any combinations thereof.

In some embodiments, the mesh material comprises a porosity of at least 75 μm.

In some embodiments, the mesh material comprises a thickness from about 0.1 mm to about 2.0 mm.

In some embodiments, the adhesive agent is applied to at least one point on the anterior face of the mesh material such that the adhesive agent directly contacts a surface of the body implant. In some embodiments, the adhesive agent is applied to at least one point on a posterior surface of the body implant such that the adhesive agent directly contacts the anterior face of the mesh material.

In some embodiments, the device further comprises a silicone disc centrally positioned between the anterior face of the mesh material and a posterior surface of the body implant. In some embodiments, an adhesive agent is applied to at least one point on an anterior surface of the disc such that the adhesive agent directly contacts a surface of the body implant. In some embodiments, an adhesive agent is applied to at least one point on a posterior surface of the disc such that the adhesive agent directly contacts the anterior face of the mesh material.

In some embodiments, the device is substantially coated with at least one biologically active agent. In some embodiments, the at least one biologically active agent is selected from the group consisting of an antibacterial agent, antifungal agent, anti-inflammatory agent, and any combinations thereof.

In some embodiments, the mesh material comprises an in vivo half-life of at least about two weeks to about 6 months.

In some embodiments, the biodegradable adhesive agent comprises polyurethane, epoxy, fibrin, gelatin-resorcinol-formaldehyde/glutaraldehyde, cyanoacrylate, polysaccharides, polypeptides, and any combinations thereof. In some embodiments, the biodegradable adhesive agent is a UV curable adhesive, an acrylic adhesive, an anaerobic adhesive, a poly(ethylene glycol) (PEG)-based hydrogel adhesive, and any combinations thereof. In some embodiments, the adhesive agent is sterilizable. In some embodiments, the adhesive agent maintains an initial binding force of at least 1N after application.

In some embodiments, the device further comprises at least one biocompatible and bioabsorbable tab for securing the implant in a fixed position. In some embodiments, the at least one tab extends outwardly from the device and attaches to at least one point on the implant. In some embodiments, the at least one tab comprises polyethylene, polyurethane, polylactic acid, polydioxanone, polyglycolide, polyglycolic acid, polyglactin, polyglyconate, lactomer glycolide/lactide copolymer, polydimethylsiloxane, polysiloxane, polypropylene, caprolactone, poliglecaprone, polycaprolate, cat gut, and any combinations thereof.

In some embodiments, the body implant is a breast implant.

In some embodiments, the portion of the subject's body to which the posterior portion of the device is attached comprises a portion of the subject's chest wall. In some embodiments, the device is secured in a prepectoral position. In some embodiments, the device is secured in a subpectoral position.

Embodiments of the present disclosure also include a system for securing a body implant in a fixed position. In accordance with these embodiments, the system includes any of the devices described herein, and one or more of a biodegradable attachment means, a biodegradable flexible tab, a placement tool, and a means for altering the shape of the device.

Embodiments of the present disclosure also include a method for securing a body implant in a fixed position in a subject. In accordance with these embodiments, the method includes attaching any of the devices described herein to a portion of the subject's body, and attaching the body implant to the device. In some embodiments, the method includes attaching the body implant to any of the devices described herein, and attaching the device/implant to a portion of the subject's body.

In some embodiments, the method includes altering the shape of the device prior to attaching the device to a portion of the subject's body.

In some embodiments, the method includes securing the body implant in a fixed position using at least one biocompatible and bioabsorbable tab attached to both the implant and the device.

In some embodiments, the method includes using a placement tool to: (i) identify a target location on a portion of the subject's body to which the device will be attached; (ii) to determine a target size for the device prior to attachment of the device to a portion of the subject's body; and/or (iii) to measure the distance from a point on the subject's body to the inframammary fold of the subject.

In some embodiments, the body implant is a breast implant, and the portion of the subject's body to which the device is attached comprises a portion of the subject's chest wall.

Embodiments of the present disclosure also include a body implant comprising any of the body implant fixation devices descried herein. In accordance with these embodiments, the anterior face of the device is attached to a posterior surface of the body implant using a biocompatible and bioabsorbable adhesive agent, and the posterior face is configured for attachment to a portion of a subject's body.

Embodiments of the present disclosure also include a body fixation device placement tool. In accordance with these embodiments, the tool includes a guide hole for positioning the body fixation device at a centrally located location on a portion of a subject's body, and a means for measuring a distance from the guide hole to a target location. In some embodiments, the target location is one or more of a suture location, a portion of the inframammary fold, and/or a location on the body fixation device.

In some embodiments, the suture location corresponds to a portion of the subject's body to which the device will be attached.

In some embodiments, the placement tool determines a maximum distance between a point on the subject's body to the inframammary fold.

In some embodiments, the placement tool determines a target size for the device prior to attachment of the device to a portion of the subject's body.

BRIEF DESCRIPTION OF THE DRAWINGS

FIG. 2 includes a representative perspective view of a body implant fixation device and a silicone disc, according to one embodiment of the present disclosure.

FIG. 3 includes a representative perspective view of a body implant fixation device configured into a triangular shape, according to one embodiment of the present disclosure.

FIG. 4 includes a representative perspective view of a substantially circular body implant fixation device comprising an adhesive agent applied at a centrally located position on the fixation device, according to one embodiment of the present disclosure.

FIG. 5 includes a representative exploded view of a body implant fixation device and system, according to one embodiment of the present disclosure.

FIG. 6 includes a representative cross-sectional view of a body implant fixation device and system attached to a portion of a subject's chest wall in a prepectoral/subglandular position, according to one embodiment of the present disclosure.

FIG. 7 includes a representative cross-sectional view of a body implant fixation device and system attached to a portion of a subject's chest wall in a subpectoral position, according to one embodiment of the present disclosure.

FIG. 8 includes a representative perspective view of a body fixation device placement tool comprising a guide hole and measurement means, which is used to guide suture placement based on the inframammary fold, according to one embodiment of the present disclosure.

FIG. 9 includes a representative perspective view of a body fixation device placement tool comprising a guide hole and measurement means, which is used to configure the mesh material based on the size of the body implant, according to one embodiment of the present disclosure.

DETAILED DESCRIPTION

Figure 1:
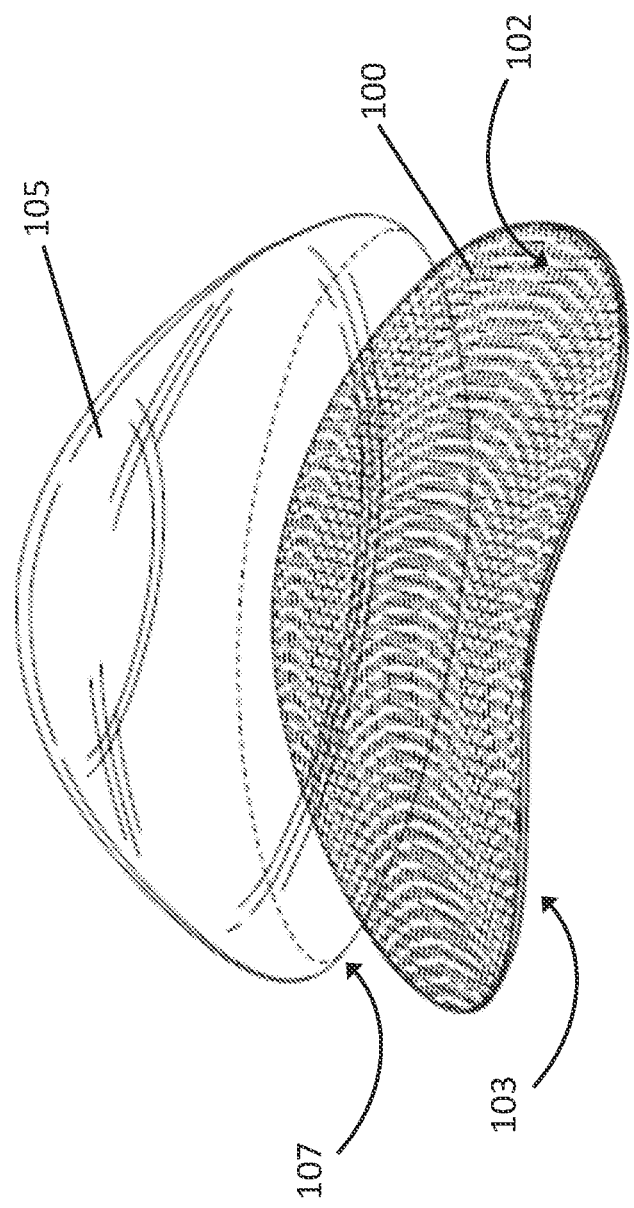
FIG. 1 includes a representative perspective view of a body implant fixation device, according to one embodiment of the present disclosure.

Section headings as used in this section and the entire disclosure herein are merely for organizational purposes and are not intended to be limiting.

1. Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the transitional phrase "consisting essentially of" (and grammatical variants) is to be interpreted as encompassing the recited materials or steps "and those that do not materially affect the basic and novel characteristic(s)" of the claimed invention. Thus, the term "consisting essentially of" as used herein should not be interpreted as equivalent to "comprising."

"About" is used to provide flexibility to a numerical range endpoint by providing that a given value may be "slightly above" or "slightly below" the endpoint without affecting the desired result.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated. Recitation of ranges of values herein are merely intended to serve as a shorthand method of referring individually to each separate value falling within the range, unless otherwise-Indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this disclosure.

"Subject" and "patient" as used herein interchangeably refers to any vertebrate, including, but not limited to, a mammal (e.g., cow, pig, camel, llama, horse, goat, rabbit, sheep, hamsters, guinea pig, cat, dog, rat, and mouse, a non-human primate (e.g., a monkey, such as a cynomolgus or rhesus monkey, chimpanzee, etc.) and a human). In some embodiments, the subject may be a human or a non-human. In one embodiment, the subject is a human. The subject or patient may be undergoing various forms of treatment.

The terms "biocompatible" and "biocompatibility" as used herein generally refer to a material or a property of a material that does not cause an adverse reaction in a subject when placed in proximity to a portion of the subject's body or when in contact with one or more of the subject's tissues (internally or externally positioned). Adverse reactions include inflammation, infection, fibrotic tissue formation, cell death, thrombosis, and the like.

The terms "biodegradable" and "bioabsorbable" as used herein generally refer to a material or a property of a material that is capable of being broken down (catabolized and/or metabolized, absorbed and/or excreted) inside a subject by any means, without causing or being associated with a significant adverse reaction in a subject. For example, a biodegradable material and a device made of biodegradable material does not persist within a subject's body long-term, but is substantially absorbed and/or broken down by the subject's body in a manner that has no significant detrimental physiological and/or biochemical effects on the subject.

"Implant" and "body implant" generally refer to an article or device that is placed entirely or partially into a subject (e.g., breast implant), for example by a surgical procedure or medical intervention, for any period of time.

Unless otherwise defined herein, scientific and technical terms used in connection with the present disclosure shall have the meanings that are commonly understood by those of ordinary skill in the art. The meaning and scope of the terms should be clear; in the event, however of any latent ambiguity, definitions provided herein take precedent over any dictionary or extrinsic definition. Further, unless otherwise required by context, singular terms shall include pluralities and plural terms shall include the singular.

2. Body Implant Devices and Systems

Embodiments of the present disclosure relate generally to devices, systems, and methods for positioning and securing a body implant in a subject in a manner that is customizable for each subject and minimizes implant migration. The devices, systems, and methods described herein utilize biocompatible and biodegradable materials that provide enhanced long-term fixation of the implant.

As described further herein, the fixation devices of the present disclosure can be comprised of mesh-like material(s) that can be affixed to both an implant (e.g., breast implant) and to a portion of the body of a subject (e.g., the chest wall). The devices described herein are generally comprised of a biocompatible material, and in some cases, a material(s) that is biodegradable/bioabsorbable (e.g., absorbed by the subject's body with little to no detrimental side effects). The devices of the present disclosure can be configured for anchoring (e.g., suture holes that are pre-formed or are prepared pre-operatively for a given patient) to allow fixation at any desired location in the subject.

In some embodiments, the devices of the present disclosure comprise bio-absorbable material that forms a mesh, such that there are holes or passages through the thickness of the material. These lattice or screen-like openings allow sutures or other conventional fixation mechanisms to be placed at any location along the perimeter of the mesh and within the area of the mesh. In some embodiments, the device is attached to a surface of an implant (e.g., an anterior surface of the device is attached to a posterior surface of an implant) using a biocompatible and biodegradable/bioabsorbable adhesive agent. In this configuration, the device can be fixed to, for example, the chest wall of a subject, and the implant can be directly fixed to the device, in contrast to conventional methods that use an indirect approach.

Another advantage of the fixation devices and systems of the present disclosure is their compatibility with any type of "off-the-shelf" breast implant. For example, the devices and systems of the present disclosure are compatible with both silicone and saline implants and can be attached to the implant using various different methods, as described further herein (e.g., using an adhesive agent). In some embodiments, biocompatible and biodegradable tabs can be included with the devices and systems of the present disclosure as auxiliary or supplemental attachment means for coupling the implant to the device. As described further herein, the means for attaching the device to the body wall of a subject, and the means for attaching the implant to the device, will degrade or be absorbed by the subject's body after a certain number of weeks whereby the subject's body will have encapsulated the implant, obviating reliance on long-term fixation means. This configuration results in less restriction of long-term motion of the implant within the subject.

These and other advantages would be readily apparent to one of ordinary skill in the art based on the present disclosure. It would also be apparent to one of ordinary skill that, although the fixation devices and systems disclosed herein are primarily described with reference to breast implants, it is within the scope of the disclosure that the device can be used with many other types of tissue expanders or other bodily implants that are used for cosmetic or reconstructive purposes.

Turning to the embodiments represented in the figures, the body implant fixation devices of the present disclosure are generally comprised of a mesh material as shown in FIG. 1. In this embodiment, the body implant fixation device (100) is made of biocompatible and bioabsorbable mesh-like material(s) designed to adhere to a posterior portion or surface (107) of a body implant (105). The mesh material is substantially malleable such that it can be configured or manipulated into various shapes and sizes, depending on various factors, such as but not limited to, the size and shape of the implant (105) to which it will be attached, its placement on a subject's body, and the length of time for which it will persist in the subject's body. As shown in FIG. 1, the body implant fixation device (100) is substantially flat, and comprises an anterior face (102) and a posterior face (103). The anterior face (102) is designed to be adjacent to a posterior portion (107) of an implant (105), while the posterior face (103) is designed to be adjacent to a portion of a subject's body (see, e.g., FIGS. 6 and 7). In accordance with these embodiments, the device (100) secures a body implant (105) in a fixed position for an extended period of time, but not indefinitely, due to it being comprised of bioabsorbable/biodegradable material(s). In some embodiments, the device (100) persists within the subject's body only until the implant (105) has been substantially encapsulated by the subject's body, after which the device (100) degrades or is absorbed by the subject's body. This allows the implant (105) to have increased mobility and does not restrict long-term motion.

In some embodiments, the mesh material of the body implant fixation device (100) is made up a mesh material that is biocompatible and bioabsorbable. The mesh material used to construct the device can include any material that is biocompatible and bioabsorbable. For example, the mesh material(s) can include, but is not limited to, polyethylene, polyurethane, polylactic acid, polydioxanone, polyglycolide, polyglycolic acid, polyglactin, polyglyconate, lactomer glycolide/lactide copolymer, polydimethylsiloxane, polysiloxane, polypropylene, caprolactone, poliglecaprone, polycaprolate, cat gut, and any combinations thereof. In some embodiments, the mesh material is made of a synthetic material. In other embodiments, the mesh material is made of a natural material. In some embodiments, the mesh material is made of a combination of synthetic and natural material. Other materials can also be used, in combination with or independent of, the materials described herein, as would be recognized by one of ordinary skill in the art based on the present disclosure.

In some embodiments, the mesh material has certain characteristics or material properties that render it useful as a body implant fixation device. These characteristics can include, but are not limited to, bio-absorbability, biodegradability, biocompatibility, a prescribed in vivo half-life, porosity, elasticity, mechanical behavior, trim-ability, malleability, flexibility, tensile strength, stiffness, weight, curability, and the like. One or more of these and other characteristics can be important parameters for constructing the body implant fixation devices of the present disclosure, and can vary depending on the specific use of the device, type of implant, body location, and the like.

For example, the mesh material can have a certain porosity that makes the mesh material well suited for use in a subject's body (e.g., biocompatible). In some embodiments, the mesh material has a porosity that is at least 75 µm, which minimizes the risk of infection. In some embodiments, the mesh material has a porosity of at least 100 µm, at least 200 µm, at least 300 µm, at least 400 µm, at least 500 µm, at least 600 µm, at least 700 µm, at least 800 µm, at least 900 µm, at least 1000 µm (1 mm). In some embodiments, the mesh material has a porosity of about 50 µm to about 1 mm. In some embodiments, the mesh material has a porosity of about 50 µm to about 750 µm. In some embodiments, the mesh material has a porosity of about 50 µm to about 500 µm. In some embodiments, the mesh material has a porosity of about 50 µm to about 250 µm. In some embodiments, the mesh material has a porosity of about 50 µm to about 150 µm.

In some embodiments, the body implant fixation devices of the present disclosure exhibit a certain thickness. In some embodiments, the mesh material(s) used to construct the devices of the present disclosure has a uniform thickness. In other embodiments, the mesh material(s) used to construct the devices of the present disclosure has varying degrees of thickness across the length and width of the device. In some embodiments, the mesh material has a thickness from about 0.05 mm to about 2.5 mm. In some embodiments, the mesh material has a thickness from about 0.05 mm to about 2.0 mm. In some embodiments, the mesh material has a thickness from about 0.05 mm to about 1.5 mm. In some embodiments, the mesh material has a thickness from about 0.05 mm to about 1.0 mm. In some embodiments, the mesh material has a thickness from about 0.05 mm to about 0.5 mm. In some embodiments, the mesh material has a thickness from about 0.1 mm to about 2.5 mm. In some embodiments, the mesh material has a thickness from about 0.1 mm to about 2.0 mm. In some embodiments, the mesh material has a thickness from about 0.1 mm to about 1.5 mm. In some embodiments, the mesh material has a thickness from about 0.1 mm to about 1.0 mm. In some embodiments, the mesh material has a thickness of at least about 0.05 mm, at least about 0.1 mm, at least about 0.15 mm, at least about 0.2 mm, at least about 0.25 mm, at least about 0.3 mm, at least about 0.35 mm, at least about 0.4 mm, at least about 0.5 mm, or at least about 1.0 mm.

In some embodiments, the mesh material(s) is designed to provide the device with a certain in vivo half-life after implantation. In some embodiments, the in vivo half-life of the device corresponds to a measurement of the time it takes for half of the device to be substantially absorbed and/or degraded in the body of the subject. A desired in vivo half-life can be adjusted by altering the composition of the mesh material. In some embodiments, the in vivo half-life of the device is dependent upon the time it takes for a subject's body to encapsulate the implant, such that the device is no longer present in the body, and no longer necessary for the securing/positioning the implant within the subject's body. In some embodiments, the in vivo half-life of the device is at least 1 week. In some embodiments, the in vivo half-life of the device is at least 2 weeks. In some embodiments, the in vivo half-life of the device is at least 3 weeks. In some embodiments, the in vivo half-life of the device is at least 4 weeks. In some embodiments, the in vivo half-life of the device is at least 5 weeks. In some embodiments, the in vivo half-life of the device is at least 6 weeks. In some embodiments, the in vivo half-life of the device is at least 7 week. In some embodiments, the in vivo half-life of the device is at least 8 weeks. In some embodiments, the in vivo half-life of the device is at least 2 months, at least about 3 months, at least about 4 months, at least about 5 months, at least about 6 months at least about 7 months, at least about 8 months, at least about 9 months, or at least about 10 months.

In some embodiments, the in vivo half-life of the device is from about 1 week to about 10 months. In some embodiments, the in vivo half-life of the device is from about 1 week to about 8 months. In some embodiments, the in vivo half-life of the device is from about 1 week to about 6 months. In some embodiments, the in vivo half-life of the device is from about 1 week to about 4 months. In some embodiments, the in vivo half-life of the device is from about 1 week to about 2 months. In some embodiments, the in vivo half-life of the device is from about 2 weeks to about 10 months. In some embodiments, the in vivo half-life of the device is from about 2 weeks to about 8 months. In some embodiments, the in vivo half-life of the device is from about 2 weeks to about 6 months. In some embodiments, the in vivo half-life of the device is from about 2 weeks to about 4 months. In some embodiments, the in vivo half-life of the device is from about 2 weeks to about 2 months. In some embodiments, the in vivo half-life of the device is from about 2 weeks to about 1 month. In some embodiments, the in vivo half-life of the device is from about 3 weeks to about 10 months. In some embodiments, the in vivo half-life of the device is from about 3 weeks to about 8 months. In some embodiments, the in vivo half-life of the device is from about 3 weeks to about 6 months. In some embodiments, the in vivo half-life of the device is from about 3 weeks to about 4 months. In some embodiments, the in vivo half-life of the device is from about 3 weeks to about 2 months. In some embodiments, the in vivo half-life of the device is from about 3 weeks to about 1 month. In some embodiments, the in vivo half-life of the device is from about 4 weeks to about 8 months. In some embodiments, the in vivo half-life of the device is from about 4 weeks to about 6 months. In some embodiments, the in vivo half-life of the device is from about 4 weeks to about 4 months. In some embodiments, the in vivo half-life of the device is from about 4 weeks to about 2 months. In some embodiments, the in vivo half-life of the device is from about 5 weeks to about 10 months. In some embodiments, the in vivo half-life of the device is from about 5 weeks to about 8 months. In some embodiments, the in vivo half-life of the device is from about 5 weeks to about 6 months. In some embodiments, the in vivo half-life of the device is from about 5 weeks to about 4 months. In some embodiments, the in vivo half-life of the device is from about 5 weeks to about 2 months. In some embodiments, the in vivo half-life of the device is from about 6 weeks to about 10 months. In some embodiments, the in vivo half-life of the device is from about 6 weeks to about 8 months. In some embodiments, the in vivo half-life of the device is from about 6 weeks to about 6 months. In some embodiments, the in vivo half-life of the device is from about 6 weeks to about 4 months. In some embodiments, the in vivo half-life of the device is from about 6 weeks to about 2 months.

FIGS. 2-4 include representative schematic diagrams of several different embodiments of the body implant fixation devices of the present disclosure. FIG. 2 includes a representative perspective view of a body implant fixation device (100) that includes a silicone disc (115) centrally positioned on the device. In some embodiments, the silicone disc (115) provides additional attachment means for the device. For example, an adhesive agent(s) can be applied to the disc to help position or secure the device to a posterior portion of an implant (described further below; see, e.g., FIG. 5). The disc (115) can be made from materials that include silicone as well as other materials. The disc (115) can also be made of a material that is biocompatible and bioabsorbable/biodegradable. In some embodiments, the disc (115) is made of a material that is biocompatible but not necessarily bioabsorbable/biodegradable (e.g., silicone), in which case the disc may persist in the body longer than the mesh material to which it is adhered.

The body implant fixation devices of the present disclosure are malleable, so they can be configured into any desired size and shape. For example, a medical professional can determine the best configuration for the device, and then configure the mesh material(s) to be that shape before attaching the device to a portion of a subject's body and/or an accompanying implant. The particular configuration can be pre-determined (e.g., pre-cut) or it can be determined as the medical professional is performing a corresponding medical procedure. The medical professional can alter or manipulate the device using any means known in the art (e.g., medical scissors), or the mesh material used to construct the device can be perforated or pre-cut into various shapes, such that a separate tool is not necessary to configure the device for a particular subject. In this manner, the body implant fixation devices of the present disclosure are customizable for each subject.

In some embodiments, the body fixation device (100) includes a rim around the outside edge of the mesh material, such as shown in FIGS. 2 and 3. In some embodiments, the rim is flexible but firm and maintains its general shape (e.g., FIG. 2). In other embodiments, the rim is flexible and malleable such that it can be bent into any desired configuration (e.g., FIG. 3). In some embodiments, the mesh device occupies varying amounts of a posterior surface of a body implant. In some embodiments, the device covers the majority of a posterior surface of a body implant (FIG. 3); and in other embodiments, the device covers less than the majority of a posterior surface of a body implant (FIG. 4). In some embodiments, the device is adhered to a central position on a posterior surface of a body implant (FIG. 4).

As referenced above, the body implant fixation devices of the present disclosure can include an adhesive agent (110) that helps position and secure the device (100) to an implant (105), as is shown in FIG. 5. In some embodiments, the adhesive agent is biocompatible and bioabsorbable/biodegradable. In some embodiments, the adhesive agent (110) is applied to at least one point on the anterior face of the mesh material (102) such that the adhesive agent directly contacts a surface of the body implant (105). In some embodiments, the adhesive agent (110) is applied to at least one point on a posterior surface of the body implant (107) such that the adhesive agent directly contacts the anterior face of the mesh material (102). In some embodiments, the device further comprises a silicone disc (115) centrally positioned between the anterior face (102) of the mesh material and a posterior surface of the body implant (107). In some embodiments, an adhesive agent (110) is applied to at least one point on an anterior surface of the disc (115) such that the adhesive agent directly contacts a surface of the body implant (105). In some embodiments, an adhesive agent (110) is applied to at least one point on a posterior surface of the disc (115) such that the adhesive agent directly contacts the anterior face (102) of the mesh material. In some embodiments, the adhesive agent (115) is applied to multiple surfaces to help secure and position the implant to the device.

In some embodiments, the biodegradable/bioabsorbable adhesive agent comprises polyurethane, epoxy, fibrin, gelatin-resorcinol-formaldehyde/glutaraldehyde, cyanoacrylate, polysaccharides, polypeptides, and any combinations thereof. In some embodiments, the biodegradable/bioabsorbable adhesive agent is a UV curable adhesive, an acrylic adhesive, an anaerobic adhesive, a poly(ethylene glycol) (PEG)-based hydrogel adhesive, and any combinations thereof. In some embodiments, the biodegradable/bioabsorbable adhesive agent is sterilizable. In some embodiments, the biodegradable/bioabsorbable adhesive agent maintains an initial binding force of at least 1N after application.

In some embodiments, the device is substantially coated with at least one biologically active agent. In some embodiments, the biologically active agent includes, but is not limited to, an antibacterial agent, an antifungal agent, an anti-inflammatory agent, and any combinations thereof. The biological agent can be applied in conjunction with, or separate from, the adhesive agent. In some embodiments, the biologically active agent imparts to the device an advantageous property (e.g., sterility). The biologically active agent can be pre-applied to the device, and/or applied as part of a medical procedure by a medical professional.

As further shown in FIG. 5, the body implant fixation devices of the present disclosure are configured of a mesh material that comprises a plurality of attachment points for inserting at least one biocompatible and biodegradable/bioabsorbable fastener (140) with which to attach the device to a portion of the subject's body. In some embodiments, the fastener (140) includes, but is not limited to, a suture, a screw, a hook, a staple, a clip, an adhesive, and any combinations thereof. In some embodiments, the fastener (140) comprises polyethylene, polyurethane, polylactic acid, polydioxanone, polyglycolide, polyglycolic acid, polyglactin, polyglyconate, lactomer glycolide/lactide copolymer, polydimethylsiloxane, polysiloxane, polypropylene, caprolactone, poliglecaprone, polycaprolate, cat gut, and any combinations thereof. In some embodiments, the fastener is made of a synthetic material. In other embodiments, the fastener is made of a natural material. In some embodiments, the fastener is made of a combination of synthetic and natural material Other materials can also be used, in combination with or independent of, the materials described herein, as would be recognized by one of ordinary skill in the art based on the present disclosure.

Because of the configuration of the mesh material, the fastener can be secured in any desired location on the device, and then secured to an appropriate position on a portion of a subject's body, as shown in FIGS. 6 and 7. In these embodiments, the body implant (105) is a breast implant, and the device (100) is used to attach the implant to the chest wall of the subject. In some embodiments, the portion of the subject's body to which the posterior portion of the device (103) is attached comprises a portion of the subject's chest wall. In some embodiments, the device (100) is used to position and secure an implant (105) in a substantially prepectoral position (FIG. 6). In other embodiments, the device (100) is used to position and secure an implant (105) in substantially a subpectoral position (FIG. 7).

In accordance with the above embodiments, the present disclosure also provides a system or kit for securing a body implant in a fixed position. In some embodiments, the system or kit includes any of the devices described herein, and one or more of a biodegradable attachment means (e.g., sutures), a biodegradable flexible tab, a placement tool, and a means for altering the shape of the device (e.g., scissors). Other components of the system or kit can also be included, as would be recognized by one of ordinary skill in the art based on the present disclosure, including but not limiting to, instructions for use, a body implant, an adhesive agent, a sterilizing agent, a silicone disc, and the like.

Embodiments of the present disclosure also include a body implant comprising any of the body implant fixation devices descried herein. In accordance with these embodiments, and as described further herein, the anterior face of the device is attached to a posterior surface of the body implant using a biocompatible and biodegradable/bioabsorbable adhesive agent, and the posterior face is configured for attachment to a portion of a subject's body.

In a non-limiting example, the bio-absorbable/biodegradable mesh material of the body implant fixation devices described herein is formed from an FDA-approved material such as Vicryl®. The fixation device can additionally comprise a portion made of silicone. In embodiments where silicone is used, the silicone portion can be permanently fixed to the implant. Additionally or alternately, a portion of the mesh can be coated with an FDA-approved surgical biodegradable adhesive. Using these materials, and as described further herein, the fixation devices of the present disclosure are generally degraded and/or absorbed in situ within several weeks, holding the implant in position while allowing the body time to naturally encapsulate the implant. The result is an implant that has mobility and does not restrict long-term motion.

3. Methods of Use

Breast augmentation is currently the most common cosmetic procedure in the U.S., and implant breast reconstruction is the most common form of breast reconstruction. The implants, which are typically made of silicone or saline-filled sacs, do not have any physical features for positioning the implants. It is therefore not possible to fix implants directly to the chest wall during an implant or revision procedure (e.g., exchanging an implant between planes of the chest wall). Additionally, there is currently no FDA-approved material for external fixation of implants. This means that it can be very difficult to keep these implants in the desired position during the recovery process, and practitioners often resort off-label methods for indirectly holding implants in place. As described herein, the devices, systems, and methods described of the present disclosure provide a solution to this problem.

As shown in the exemplary embodiments of FIGS. 6 and 7, the body implant fixation devices (100) of the present disclosure can be secured to the chest wall of a subject via a plurality of attachment points in the device and several sutures (140). A breast implant (105) can be attached to the device (100) using an adhesive agent (110), and an optional silicone disc (115), which can enhance the ability of a medical professional to position and secure the implant (105) to the device (100), while performing a medical procedure. As would be recognized by one of ordinary skill in the art, the device (100) can be used to position and secure the breast implant (105) in a substantially prepectoral position (FIG. 6), or in a substantially subpectoral position (FIG. 7).

In some embodiments, the device further comprises at least one biocompatible and biodegradable/bioabsorbable tab for securing the implant in a fixed position. In some embodiments, the at least one tab extends outwardly from the device and attaches to at least one point on the implant. In some embodiments, the at least one tab comprises polyethylene, polyurethane, polylactic acid, polydioxanone, polyglycolide, polyglycolic acid, polyglactin, polyglyconate, lactomer glycolide/lactide copolymer, polydimethylsiloxane, polysiloxane, polypropylene, caprolactone, poliglecaprone, polycaprolate, cat gut, and any combinations thereof. In some embodiments, the tab is made of a synthetic material. In other embodiments, the tab is made of a natural material. In some embodiments, the tab is made of a combination of synthetic and natural material. Other materials can also be used, in combination with or independent of, the materials described herein, as would be recognized by one of ordinary skill in the art based on the present disclosure.

In accordance with the above embodiments, the present disclosure also provides a method for securing and/or positioning a body implant in a fixed position in a subject. In some embodiments, the method includes attaching any of the devices described herein to a portion of the subject's body, and then attaching the body implant to the device. In other embodiments, the method includes attaching the body implant to any of the devices described herein, and then attaching the device/implant to a portion of the subject's body. In some embodiments, the method includes securing the body implant in a fixed position using at least one biocompatible and bioabsorbable tab attached to both the implant and the device.

Since the device is malleable, the method includes altering the shape of the device prior to attaching the device to a portion of the subject's body. In this manner, the body implant fixation devices of the present disclosure are customizable for each subject. For example, a medical professional can determine the best configuration for the device, and then configure the mesh material(s) to be that shape before attaching the device to a portion of a subject's body and/or an accompanying implant. The particular configuration can be pre-determined or it can be determined as the medical professional is performing a corresponding medical procedure. The medical professional can alter or manipulate the device using any means known in the art (e.g., medical scissors), or the mesh material used to construct the device can be perforated or pre-cut into various shapes, such that a separate tool is not necessary to configure the device for a particular subject.

As referenced above, and as shown in FIGS. 8 and 9, embodiments of the present disclosure also include a body fixation device placement tool (150 and 155, respectively). In accordance with these embodiments, the tool includes a guide hole (160) for positioning the body fixation device at a centrally located location on a portion of a subject's body, and a means for measuring a distance from the guide hole to a target location (165). In some embodiments, the target location is one or more of a suture location, a portion of the inframammary fold, and/or a location on the body fixation device. For example, the placement tool shown in FIG. 8 comprises a guide hole (160) and measurement means (165), which is used to guide suture placement based on the inframammary fold. Similarly, the placement tool shown in FIG. 9 comprises a guide hole (160) and measurement means (165), which is used to configure the mesh material based on the size of the body implant. In some embodiments, the suture location corresponds to a portion of the subject's body to which the device will be attached. In some embodiments, the placement tool determines a maximum distance between a point on the subject's body to the inframammary fold. In some embodiments, the placement tool determines a target size for the device prior to attachment of the device to a portion of the subject's body.

In accordance with these embodiments, the methods of the present disclosure include using a placement tool to: (i) identify a target location on a portion of the subject's body to which the device will be attached; (ii) to determine a target size for the device prior to attachment of the device to a portion of the subject's body; and/or (iii) to measure the distance from a point on the subject's body to the inframammary fold of the subject. In some embodiments, the body implant is a breast implant, and the portion of the subject's body to which the device is attached comprises a portion of the subject's chest wall.

One skilled in the art will readily appreciate that the present disclosure is well adapted to carry out the objects and obtain the ends and advantages mentioned, as well as those inherent therein. The present disclosure described herein are presently representative of preferred embodiments, are exemplary, and are not intended as limitations on the scope of the present disclosure. Changes therein and other uses will occur to those skilled in the art which are encompassed within the spirit of the present disclosure as defined by the scope of the claims.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise. The present disclosure shall control in the event there are any disparities between any definitions and/or description found in the cited references.

What is claimed is:

1. A body implant fixation device comprising:
   a biocompatible and bioabsorbable mesh material having an anterior face and a posterior face, wherein the anterior face is configured for attachment to a body implant using a biocompatible and bioabsorbable adhesive agent, and wherein the posterior face is configured for attachment to a portion of a subject's body; and
   a silicone disc centrally positioned between the anterior face of the mesh material and a posterior surface of the body implant;
   wherein the device secures the body implant in a fixed position for an extended period of time.

2. The device of claim 1, wherein the mesh material comprises a plurality of attachment points for inserting at least one biocompatible and bioabsorbable fastener with which to attach the device to the portion of the subject's body.

3. The device of claim 2, further comprising at least one fastener selected from the group consisting of a suture, a screw, a hook, a staple, a clip, an adhesive, and any combinations thereof.

4. The device of claim 1, wherein the mesh material and/or the at least one fastener comprises polyethylene, polyurethane, polylactic acid, polydioxanone, polyglycolide, polyglycolic acid, polyglactin, polyglyconate, lactomer glycolide/lactide copolymer, polydimethylsiloxane, polysiloxane, polypropylene, caprolactone, poliglecaprone, polycaprolate, cat gut, and any combinations thereof.

5. The device of claim 1, wherein the mesh material comprises a porosity of at least 75 μm.

6. The device of claim 1, wherein the mesh material comprises a thickness from about 0.1 mm to about 2.0 mm.

7. The device of claim 1, wherein the biodegradable adhesive agent comprises polyurethane, epoxy, fibrin, gelatin-resorcinol-formaldehyde/glutaraldehyde, cyanoacrylate, polysaccharides, polypeptides, and any combinations thereof.

8. The device of claim 1, wherein the biodegradable adhesive agent is a UV curable adhesive, an acrylic adhesive, an anaerobic adhesive, a poly(ethylene glycol) (PEG)-based hydrogel adhesive, and any combinations thereof.

9. The device of claim 1, wherein the adhesive agent maintains an initial binding force of at least 1N after application.

10. The device of claim 1, wherein the device further comprises at least one biocompatible and bioabsorbable tab for securing the implant in a fixed position, wherein the at least one tab extends outwardly from the device and attaches to at least one point on the implant.

11. The device of claim 1, wherein the body implant is a breast implant, and wherein the portion of the subject's body to which the posterior portion of the device is attached comprises a portion of the subject's chest wall.

12. A system for securing a body implant in a fixed position, the system comprising:
 any of the devices of claim 1; and
 one or more of a biodegradable attachment means, a biodegradable flexible tab, a placement tool, and a means for altering the shape of the device.

13. A method for securing a body implant in a fixed position in a subject, the method comprising:
 attaching any of the devices of claim 1 to a portion of the subject's body; and
 attaching the body implant to the device.

14. The method of claim 13, further comprising using a placement tool to:
 (i) identify a target location on a portion of the subject's body to which the device will be attached;
 (ii) to determine a target size for the device prior to attachment of the device to a portion of the subject's body; and/or
 (iii) to measure the distance from a point on the subject's body to the inframammary fold of the subject.

15. The method of claim 13, wherein the body implant is a breast implant, and wherein the portion of the subject's body to which the device is attached comprises a portion of the subject's chest wall.

16. A body fixation device placement tool comprising:
 a guide hole for positioning the body fixation device at a centrally located location on a portion of a subject's body; and
 a means for measuring a distance from the guide hole to a target location;
 wherein the target location is one or more of a suture location, a portion of the inframammary fold, and/or a location on the body fixation device; and
 wherein the placement tool determines a maximum distance between a point on the subject's body to the inframammary fold.

17. The placement tool of claim 16, wherein the suture location corresponds to a portion of the subject's body to which the device will be attached.

18. The placement tool of claim 16, wherein the placement tool determines a target size for the device prior to attachment of the device to a portion of the subject's body.

* * * * *